United States Patent Office 2,836,581
Patented May 27, 1958

2,836,581

PROCESS FOR MAKING RESINS

Leon B. Gordon, Texas City, Tex., assignor to
The American Oil Company

No Drawing. Application March 1, 1955
Serial No. 491,508

7 Claims. (Cl. 260—82)

This invention relates to synthetic resins and particularly to synthetic hydrocarbon resins. More specifically, my invention relates to the production of synthetic resins from a selected fraction of dripolene, the normally liquid mixture of hydrocarbons obtained in the high-temperature pyrolysis of normally gaseous hydrocarbons.

It is well known that useful resins and/or oils can be prepared from various unsaturated hydrocarbons and mixtures thereof, by polymerization in the presence or absence of catalytic substances. It is also well known that the high temperature pyrolysis of normally gaseous hydrocarbons in which the hydrocarbons undergo a variety of complex reactions including cracking, dehydrogenation, aromatization, polymerization and the like, produces a heterogeneous mixture comprising olefins, diolefins, cycloolefins, aromatics and other constituents of diverse physical properties and characteristics. The normally liquid mixture of hydrocarbons which is so produced is commonly known in the art as dripolene. It is possible to produce oily and resinous products by polymerizing dripolene. The resinous products are, however, generally of an undesirably dark color. Such resins have been useful as components of protective coating compositions where their dark color is of not important consequence. Such resins produced by polymerization of dripolene have heretofore been unsatisfactory for use as components in mastic tile because of their dark color and particularly because the use of such resins produced a tile which was soft and highly susceptible to indentation. It is highly important that mastic tiles have a good resistance to indentation since traffic over floor tile, for example, subjects the tile to compressive forces which might permanently deform the wearing surface of the tile. If the wearing surface of the tile is quickly deformed, its life is short and it must be removed and replaced. The importance of good indentation has lead mastic tile manufacturers to the use of expensive synthetic resins prepared by the polymerization of synthesized unsaturated monomers. Polystyrene is an example of such a resin which has been employed in large quantities in mastic tile.

An object of this invention is to prepare a hydrocarbon resin of improved chemical and physical properties. Another object is to prepare a hydrocarbon resin useful as a component in mastic tile formulations. A further object is to provide a process for converting dripolene to a resin of light color which is useful in the preparation of indentation-resistive mastic tile. An additional object of this invention is to provide a highly efficient and economical method for converting inexpensive charging stock to a resin of high quality and value, which is particularly useful as a binder in mastic tile formulations. Other objects and advantages of the invention will be apparent from the detailed description of the invention.

It has been discovered that improved resins can be prepared from a fraction of dripolene which boils within the range of about 200° and 400° F. by thermally polymerizing the dripolene fraction at a temperature between about 400 and 500° F. to produce a thermal resin which is then contacted with from about 0.01 to 0.2% by weight of $BF_3$ at a temperature above about 300° F. The low-boiling components are then removed from the reaction products and the resin thereby recovered. The thermal polymerization is preferably conducted at a temperature between about 440° and 480° F. for a period of about 5 to 50 hours. If temperatures higher than about 500° F. are employed, the product resin of this invention is black in color and unsuitable for commercial use. It has been found that if the thermal resin from the thermal polymerization step is contacted with larger amounts of $BF_3$, for example, 0.5% by weight of $BF_3$, the product resin will be black and unsuitable for commercial use. I have discovered that by employing a high-boiling fraction of dripolene boiling principally within the defined range and thermally polymerizing it within a specified temperature range, then contacting the thermal resin with defined amounts of $BF_3$ at specified temperatures followed by removing the low-boiling components from the reaction products, a resin which has light color and a high resistance to indentation can be produced.

The process of my invention employs as the charging stock, a portion of the hydrocarbon liquid commonly known in the art and referred to as dripolene. Whenever the term dripolene is used, hereinafter, it is to be understood to mean the normally liquid mixture of hydrocarbons obtained by the high temperature pyrolysis of a normally gaseous hydrocarbon containing at least two or more carbon atoms in the molecule, or a mixture of such hydrocarbons. The high temperature pyrolysis is carried out at a temperature between about 1200° and 1800° F. and contact times between about 0.05 and 5 seconds. The normally gaseous hydrocarbon which is charged to the high temperature pyrolysis may be a by-product refinery gas such as is obtained from the cracking of petroleum oils during petroleum refining operations. In the preparation of dripolene, a gaseous hydrocarbon such as ethane, propane, propylene or mixtures thereof, is preheated and passed through an alloy tube at a high space velocity and a pyrolysis temperature between about 1200° and 1800° F. preferably between about 1350° and 1550° F. Low pressures up to about 100 p. s. i. a. are ordinarily employed in this operation, a pressure below about 35 p. s. i. a. being satisfactory. The time of exposure to the high temperatures is usually about 0.05 to 5 seconds, contact times of 0.1 to 1 second being preferred.

The pyrolysis produces normally gaseous products containing unsaturated hydrocarbon such as ethylene, normally liquid hydrocarbons rich in unsaturated hydrocarbons such as olefins and diolefins of varying boiling points and structural configuration, and various aromatic hydrocarbons, as well as tar. The unsaturated hydrocarbons such as ethylene which are contained in the normally gaseous product produced are usually the desired product of the pyrolysis process. The normally liquid hydrocarbons and tar which are produced are considered to be low-value by-products. High temperature pyrolysis products are rapidly cooled, usually by quenching with water to a temperature of about 400° F. A viscous tarry material condenses out of the gas during the quenching. The gases from the quenching operation are compressed and cooled and a liquid material which boils between about 100° and 400° F. condenses out of the gases during the compressing-cooling step. This liquid is dripolene. The amount of tar and dripolene produced is dependent upon the feed, temperature, contact time and pressure. The quantity of liquid hydrocarbons produced in this way is ordinarily about 3% by weight of the total quantity of gas charged to the pyrolysis reactor.

The normally liquid mixture of hydrocarbons which is termed dripolene has never been completely analyzed because of its complexity. A typical specimen of dripolene was characterized as follows:

ASTM distillation range, ° F.:
  Initial _____ 100
  10% _____ 146
  20% _____ 162
  30% _____ 178
  40% _____ 188
  50% _____ 196
  60% _____ 206
  70% _____ 234
  80% _____ 296
  90% _____ 340
  Final _____ 360
Gravity, ° API at 60° F_____ 34.7
Bromine number, Cg. Br$_2$/g_____ 104.1
Maleic anhydride value, mg. M. A./g_____ 79
Index of refraction, $n_D^{25}$_____ 1.4830

A typical example of dripolene was analyzed by conventional techniques and was found to contain the following compounds in the amounts specified:

Analysis, volume-percent:
  Propane and propylene_____ 0.7
  Isobutane_____ 0.1
  Isobutylene_____ 0.8
  1-butene_____ 0.5
  2-butene_____ 0.6
  n-Butane_____ 0.4
  Butadiene_____ 3.9
  Pentadienes_____ 7.7
  Pentylenes_____ 6.3
  Other C$_5$_____ 0.4
  Benzene_____ 34.2
  Toluene_____ 7.8
  Xylenes_____ 1
  Styrene_____ 3
  Dicyclopentadiene_____ 5
  Other_____ 29.6

The process of my invention employs as the charging stock thereto a fraction of dripolene which boils within the range of about 200° to 400° F., preferably about 230° to 375° F. When using a dripolene fraction substantially all of which boils at a lower temperature, it is not possible to produce a resin which provides a mastic tile with a satisfactory resistance to indentation. It is not essential that the entire fraction of dripolene boil within the specified range of about 200° to 400° F. A small portion of the dripolene fraction, e. g., as much as 15% or so, may boil below 200° F., and/or above 400° F. A suitable charging stock is a fraction of dripolene boiling over the range of about 200° to about 400° F., preferably a fraction boiling over the range of about 230° to about 375° F.

The charging stock employed in my invention can be prepared by fractionally distilling the total dripolene and withdrawing about 70 to 90% of a distillate fraction overhead. The bottoms fraction (the remaining 10 to 30% of the total dripolene subjected to fractionation) may then be used as the high-boiling fraction of dripolene charged to the process of my invention. To produce a resin of even lighter color, it is preferred to subject the 10 to 30% bottoms fraction to a second distillation. A distillate fraction comprising about 50 to 90%, preferably about 80%, is taken overhead from the second distillation and is then thermally polymerized in accordance with my process. A typical specimen of an 80% distillate fraction obtained from a 20% bottoms fraction of dripolene has the following characteristics:

ASTM distillation range, ° F.:
  Initial _____ 178
  5% _____ 193
  10% _____ 205
  20% _____ 229
  30% _____ 244
  40% _____ 283
  50% _____ 309
  60% _____ 335
  70% _____ 349
  80% _____ 355
  90% _____ 392
  95% _____ 423
  Final _____ 451
Gravity, ° API at 60° F_____ 27.9
Bromine number, cg. Br$_2$/g_____ 96
Maleic anhydride value, mg. M. A./g_____ 49
Viscosity, SSU at 100° F_____ 30
Color, Gardner_____ 5

The particular fraction of dripolene which is employed as the charging stock to this invention may have a bromine number of between about 90 and 120 and a maleic anhydride value of between about 20 and 50.

The defined fraction of dripolene is thermally polymerized at a temperature of about 400° F. to 500° F. to produce a thermo-plastic resin. The thermal polymerization is preferably conducted at a temperature between about 440° and 480° F. for a period of about 5 to 50 hours, the higher the reaction temperature employed, the shorter is the reaction time used. For example, if a temperature of about 485° F. is used, the reaction time may be about 4 to 16 hours. If a temperature of about 450° F. is used, then a reaction time of about 16 to 36 hours should be employed. A temperature of about 470° F. and a polymerization time of about 16 hours is highly satisfactory. Approximately 40 to 60% of the charging stock is converted to a thermo-plastic resin. A polymerization temperature higher than about 500° F. should not be employed since the product resin will be black in color. By thermally polymerizing within the specified temperature limits, a resin of 2 to 3 Barrett Color having an iodine number of 140 to 200 can be produced. The thermal resin produced is unsatisfactory for use in mastic tile formulations because it does not provide the necessary resistance to indentation. This latter property is imparted to the resin by treatment with BF$_3$ in a manner to be described hereinafter.

The product from the thermal polymerization step consists of the thermo-plastic resin dissolved in unpolymerized hydrocarbon liquid. This liquid may be removed from the resin by distillation or other suitable means and the resin recovered for further treatment with BF$_3$. It is preferred, however, to contact this resin while dissolved in a hydrocarbon solvent with the BF$_3$ The hydrocarbon solvent may be one such as a petroleum naphtha, xylene, or other aromatic or aliphatic hydrocarbon. The solvent may be employed in a ratio between about 0.25 and 5 volumes per volume of resin. Because the total thermal polymerization product contains the resin dissolved in unpolymerized hydrocarbon liquid, it may very conveniently be employed as the charge to the $BF_3$ contacting step.

An essential feature of my invention is the amount of $BF_3$ which is employed. This amount may be from about 0.01 to 0.2% by weight of $BF_3$ based on the amount of resin charged to the $BF_3$ contacting step. A suitable amount of $BF_3$ is about 0.1% by weight. Use of the specified amounts will produce a resin having a Barrett Color of about 5 to 6. If larger amounts of $BF_3$ are employed, for example, about 0.5 weight percent $BF_3$, the product resin will have a Barrett Color of 9 which corresponds to the black resin.

Contacting of the thermal resin while dissolved in a hydrocarbon solvent may be effected at a temperature above about 300° F. preferably about 400° to 650° F. It is preferred to add the total amount of $BF_3$ required to the solution of resin in hydrocarbon solvent while maintaining the mixture at a temperature below 120° F. After about 10 minutes, the temperature of the mixture is raised to between 400° to 650° F., e. g. 525° F. A contact time of about 0.1 to 20 hours at the elevated temperatures may be used. Contacting of the thermal resin with $BF_3$ functions in some unknown manner to improve the resistance of the resin to indentation. It also reduces the unsaturation of the resin.

Contacting of the thermal resin with $BF_3$ should be conducted in the absence of water or oxygenated organic compounds. These substances may be removed from the charging stock by passage through a bed of calcium chloride, anhydrous sodium sulfate, soda lime or other dehydrating solids which have no appreciable polymerizing effect upon the fraction of dripolene employed. The $BF_3$ which is used should be anhydrous $BF_3$.

The resin is recovered from the reaction product of the $BF_3$ contacting step and the low-boiling components are separated therefrom. This may be accomplished by flashing the total reaction product from the $BF_3$ contacting step at the reaction temperature of the latter step. Most of the low-boiling hydrocarbons in the reaction product are removed therefrom. The resin remains behind and is then stripped with an inert gas such as steam, nitrogen or the like, to remove remaining low-boiling constituents and produce a resin having a ball-and-ring softening point of above about 200° F.

Prior to stripping the resin with the inert gas, the resin may be decolorized if desired. Conventional decolorizing agents may be employed. For example the resin, which is preferably diluted with 0.25 to 5 volumes of hydrocarbon solvent such as benzene, xylene, petroleum naphtha etc. to reduce its viscosity, may be agitated at ordinary temperatures with from about 5 to 15 pounds of 95% sulfuric acid. The acid sludge is settled and withdrawn, and the treated resin contacted with Attapulgus clay or other adsorption solids to a clay life of about 25 to 50 barrels per ton. After removal of most of the solvent by distillation, the resin is then stripped of remaining low boiling constituents. An inert stripping gas such as steam, nitrogen or the like may be used. A purified resin is obtained having a Barrett Color lighter than about 4 or 5, an iodine number below about 120, and having excellent resistance to indentation when used in mastic tile.

A preferred embodiment of my invention comprises the following steps: A fraction of dripolene having an ASTM 10% point of about 205° F. and an ASTM 90% point of about 390° F. is charged to a pressure-type reactor. The reactor is heated to a temperature of about 470° and maintained thereat for about 16 hours. The reaction products are then cooled to a temperature of about 120° F. and about 0.1% by weight of gaseous $BF_3$ (based upon weight of resin) is added to the reactor. After all of the $BF_3$ has been added the mixture is heated rapidly with vigorous agitation to a temperature of about 500° F. where it is maintained for about 2 hours. At the end of this time, the pressure within the reactor is reduced by flashing off the low-boiling components. The resin is then steam-stripped at 480° F. for about 12 hours to remove low-boiling constituents. The resin so produced will have a Barrett Color of about 5, an iodine number of about 100 and will be highly resistive to indentation when employed as a binder in mastic tile.

The invention will be more fully understood from the examples and data which follow.

Dripolene obtained by pyrolysis of a $C_2$ to $C_3$ hydrocarbon mixture under conventional conditions was fractionally distilled to produce a 20% bottoms fraction having an ASTM distillation 10% point of approximately 225° F. The said bottoms fraction was thereafter steam distilled to produce an 80% overhead fraction which will be referred to hereinafter for convenience as dripolene-A. The residual 20% bottoms fraction from the second distillation was rejected. Dripolene-A had an ASTM distillation 10% point of 205° F. and as ASTM distillation 90% point of 392° F.

Dripolene-A was charged to a jacketed pressure-type reaction vessel. The vessel was closed, and its contents were agitated and heated to approximately 475° and maintained at this temperature for approximately 16 hours. The pressure reached 200 p. s. i. g. at 475° and remained at this level throughout the run. The pressure was then reduced to flash off part of the unpolymerized hydrocarbons. The reactor was then partially cooled and the resin was steam stripped at approximately 450° F. to produce a resin having a softening point of about 210° F. Resin was obtained having the following properties:

Softening point _____ ° F__ 210
Barrett Color_____ 2–3
Iodine number_____ 170

In a series of experiments, approximately 400 grams of the thermal resin were dissolved in an equal volume of xylene and introduced into a 2-liter Monel shaking bomb. Varying amounts of anhydrous $BF_3$ (0.5 gram and 2.0 grams) were added to the reactor and the bomb was sealed and heated to the desired temperature. At the end of the desired contacting time, the bomb was depressured at the contacting temperature employed, to flash off low-boiling components. The remaining reaction products were removed from the bomb. The product was then steam stripped at about 450° F. to remove low-boiling components and to yield a resin having a ball-and-ring softening point of approximately 210° F. The yield of resin from the $BF_3$ treating step was about 98%.

The iodine number and Barrett Color of the resins were determined. Separate samples of each of the resins produced were used in making mastic floor tiles which were then evaluated. The composition of the tiles was about 15% resin, 10% plasticizer (Humble TF–5—an aromatic lube oil extract), 35% calcium carbonate, and 40% asbestos. In preparing the tiles, the resin sample was mixed with plasticizer and the mixture then milled with the calcium carbonate and asbestos until the tile ingredients were thoroughly blended. Tiles made using the various resins produced were then calendered, cooled, and tested. The ability of the tiles to withstand indentation was determined by using a McBurney indentation tester which applies a rod to the tile surface with a pressure of 32 pounds. The end of the rod applied to the tile was round in shape and had a diameter of 0.25 inch. The indentation in the test tiles in mils was measured in accordance with the Federal Asphalt Tile Specification SS-T-306a. The results obtained were as follows:

| Run No. | BF₃ Contacting | | | Resin Quality | | | | |
| --- | --- | --- | --- | --- | --- | --- | --- | --- |
| | Wt. Percent BF₃ | Temp., °F. | Time, hrs. | Barrett Color | Iodine No. | Indentation in mils [1] | | |
| | | | | | | 1 min. at 77° F. | 10 min. at 77° F. | 30 sec. at 115° F. |
| Federal Specifications | | | | 2-3 | 170 | 7.0 | 11.4 | 38.0 |
| 1 | none | | | 2-3 | 170 | 7.0 | 14.0 | 47 |
| 2 | 0.125 | 525 | 2 | 5-6 | 114 | 7.0 | 11.7 | 31 |
| 3 | 0.125 | 525 | 1 | 5-6 | 111 | 7.0 | 11.0 | 37 |
| 4 | 0.125 | 475 | 8 | 5-6 | 102 | 7.25 | 14.0 | 39 |
| 5 | 0.5 | 475 | 2 | 9 | 77 | 7.0 | 11.0 | 28.5 |

[1] Determined in accordance with Federal Asphalt Tile Specification SS-T-306a.

The resin of run No. 1 was not subjected to the BF₃ contacting step. It did not pass the Federal Specification regarding maximum allowable indentations and consequently, it is not useful in mastic tile formulations. Portions of the thermal resin which were subjected to contacting with 0.125 weight percent BF₃ (based on thermal resin) had greatly improved resistance to indentation. The color of the latter BF₃-treated resins was satisfactory. In addition, the iodine number of the BF₃-treated resins was lowered. Run No. 5, however, shows that when a much higher amount of BF₃ is employed, namely 0.5 weight percent BF₃, a resin of 9 Barrett Color (corresponding to a black resin) is produced. The above data indicate the essential character of the BF₃ treatment and the criticality in the amount of BF₃ which should be employed.

Thus having described my invention what I claim is:

1. A process for making a resin from a fraction of dripolene which boils within the range of about 200° to 400° F., said dripolene consisting of the normally liquid mixture of hydrocarbons obtained in the pyrolysis of a normally gaseous hydrocarbon having at least two carbon atoms in the molecule at a temperature between about 1200° and 1800° F. and a contact time between about 0.05 and 5 seconds, thermally polymerizing said dripolene fraction at a temperature between about 400° and 500° F. whereby a portion of said dripolene fraction is converted into a thermal resin, contacting said thermal resin while dissolved in a hydrocarbon solvent with between about 0.01 and 0.2% by weight of BF₃ at a temperature above about 300° F. but not higher than about 600° F., and removing low-boiling components from the reaction products whereby an improved resin is obtained.

2. The process of claim 1 wherein said thermal polymerization is conducted at a temperature between about 440° and 480° F. for a period of about 5 to 50 hours, the higher the temperature the shorter the reaction time.

3. The process of claim 1 wherein said thermal resin is contacted with BF₃ at a temperature between about 400° F. and 650° F. in the absence of water and oxygenated organic compounds.

4. The process of claim 1 wherein the initial contacting of BF₃ with said thermal resin is effected at a temperature below about 120° F. and the reaction mixture is then heated to a temperature between about 400° F. and 650° F.

5. The process of claim 1 wherein said low-boiling components are removed from said reaction products by flashing said reaction products at a temperature between about 400° F. and 650° F. and stripping the resin thereby obtained to a ball-and-ring softening point above about 200° F.

6. A process for making a resin from a high-boiling fraction of a normally liquid mixture of unsaturated hydrocarbons obtained in the pyrolysis of a normally gaseous hydrocarbon having at least two carbon atoms in the molecule at a temperature between about 1200° and 1800° F. and a contact time between 0.05 and 5 seconds, said high-boiling fraction being obtained by fractionally distilling said normally liquid mixture of unsaturated hydrocarbons obtained in said pyrolysis step to remove between about 70 and 90% of the lowest boiling components therefrom and recovering the remaining 10 to 30% of the higher boiling components as said high-boiling fraction which boils between 200° and 400° F., thermally polymerizing said high-boiling fraction at a temperature between about 440° and 480° F. for a period of about 5 to 50 hours the higher the temperature the shorter the reaction time whereby a portion of said high-boiling fraction is converted into a thermal resin, contacting said thermal resin while dissolved in a hydrocarbon solvent with about 0.01 to 0.2% by weight of BF₃ at a temperature between about 400° F. and 650° F. in the absence of water and oxygenated organic compounds, flashing the reaction products at a temperature between about 400° and 650° F. to remove low-boiling components therefrom, and stripping the remaining reaction product to a ball-and-ring softening point above about 200° F. to produce an improved resin.

7. The process of claim 6 wherein said 10 to 30% of the higher-boiling components of said normally liquid mixture of unsaturated hydrocarbons obtained in said pyrolysis step is subjected to a second fractional distillation and a distillate fraction comprised of between about 50 and 90% of the lower-boiling components from said second distillation is recovered and employed as the high-boiling fraction charged to said thermal polymerization step.

References Cited in the file of this patent

UNITED STATES PATENTS

| | | |
| --- | --- | --- |
| 2,560,164 | Garber | July 10, 1951 |
| 2,709,695 | Wadsworth | May 31, 1955 |
| 2,712,538 | Wadsworth | July 5, 1955 |